(12) United States Patent
Ramachandraiah et al.

(10) Patent No.: US 6,811,679 B2
(45) Date of Patent: Nov. 2, 2004

(54) PROCESS FOR ELECTROCHEMICAL OXIDATION OF BROMIDE TO BROMINE

(75) Inventors: Gadde Ramachandraiah, Gujarat (IN); Pushpito Kumar Ghosh, Gujarat (IN); Venkata Rama Krishna Sarma Susarla, Gujarat (IN); Sanjay S. Vaghela, Gujarat (IN)

(73) Assignee: Council of Scientific & Industrial Research, New Delhi (IN)

( * ) Notice: Subject to any disclaimer, the term of this patent is extended or adjusted under 35 U.S.C. 154(b) by 31 days.

(21) Appl. No.: 10/400,918

(22) Filed: Mar. 28, 2003

(65) Prior Publication Data

US 2004/0188271 A1 Sep. 30, 2004

(51) Int. Cl.⁷ ................................................ C25C 1/24
(52) U.S. Cl. ...................................... 205/619; 205/618
(58) Field of Search ................................. 205/619, 618

(56) References Cited

U.S. PATENT DOCUMENTS

| | | | |
|---|---|---|---|
| 5,254,226 A | | 10/1993 | Williams et al. |
| 5,385,650 A | * | 1/1995 | Howarth et al. ............ 205/619 |
| 5,679,239 A | * | 10/1997 | Blum et al. ................. 205/556 |

FOREIGN PATENT DOCUMENTS

| | | |
|---|---|---|
| JP | 60-54905 A | 3/1985 |
| JP | 63-203781 A | 8/1988 |
| JP | 4-170302 A | 6/1992 |
| JP | 7-171581 A | 7/1995 |
| WO | WO 93/09039 A1 | 5/1993 |
| WO | WO 96/00696 A1 | 1/1996 |

OTHER PUBLICATIONS

Callihan et al., "Modified Scattering by crystalline HC1 an HBr", *Journal of Chemical Physics*, Jun. 1934, pp. 317–319, vol. 2, No. 6, American Institute of Physics.

Hornig et al., "Infrared Spectrum and the Structure of the Low–Temperature Phases of Crystalline HC1. HBr. and HI", *The Journal of Chemical Physics*, Apr. 1955 pp. 662–670. vol. 23, No. 4, American Institute of Physics.

Jolles, *Bromine and its Compounds*, 1966, Ernest Benn Limited, no month.

Kumar et al., "Kinetics and Mechanism of General–Acid–Assisted Oxidation of Bromide by Hypochlorite and Hypochlorous Acid", *Inorg. Chem.*, 1987. pp. 2706–2711. vol. 26, American Chemical Society, no month.

* cited by examiner

Primary Examiner—Wesley A. Nicolas
(74) Attorney, Agent, or Firm—Foley & Lardner LLP

(57) ABSTRACT

The present invention relates to a process for electrochemical oxidation of bromide to bromine, more particularly to oxidation of bromide ions in brine, bittern and effluents using an indigenous cation exchange membrane flow cell.

13 Claims, No Drawings

PROCESS FOR ELECTROCHEMICAL OXIDATION OF BROMIDE TO BROMINE

FIELD OF INVENTION

The present invention relates to a process for electrochemical oxidation of bromide to bromine. The present invention more particularly relates to oxidation of bromide ions in brine, bittern and effluents using an indigenous cation exchange membrane flow cell.

BACKGROUND ART

Oxidation of bromide in its source produces the elemental bromine, which is primarily used in the manufacture of both organic and inorganic bromo compounds. The compounds of bromine are well represented in many areas such as gasoline additives, agricultural chemicals, flame-retardants, dyes, photographic chemicals, pharmaceuticals etc. Besides, the high-density organo bromine compounds as hydraulic, gear/ore flotation fluids, the CaBr2-ZaBr2 composition as drilling fluid and the 1,2-dibromo ethylene as anti-knocking agent in gasoline are known to be useful. In addition, bromine is directly used as disinfectant in swimming pools, and as anti oxidant to control the growth of bacteria, algae and odor in cooling waters. It is also used for desizing of cotton, bleaching of pulp and paper, and in laboratories as a reagent.

Reference may be made to A. Frank (Z. E. Jolles, Bromine and its Compounds, Ernest Benn Limited, London 1966) wherein the oxidation of bromide to bromine has been reported by using manganese dioxide in sulfuric acid medium at 60° C. The main drawbacks of this process are that the use of sulfuric acid is hazardous, gives insoluble calcium sulfate leading to the clogging of various parts of the equipment and needs extra precautions or steps in using it. Moreover, the bromine yields are very low.

D. Callihan and E. O. Salant in J. Chem. Phys. 1934, 2, 317 have used alkali chlorate salts in place of manganese dioxide to oxidize bromide ion to bromine. The drawbacks of this method are that the oxidant is costly and it requires a mineral acid like sulfuric or hydrochloric additionally. Moreover, the chlorate salts are known to be explosive. The possibility of formation of calcium sulfate precipitate particularly when sulfuric acid is used, may lead to the blocking of various parts of the equipment.

S. M. Naude and H. Verleger Proc. Phys. Soc. 1950, 63A, 470 has used chlorine gas in place of manganese dioxide and alkali chlorates to oxidize bromide to bromine in acidic solutions. The problems normally faced with this are the handling of the more corrosive chlorine gas and the difficulty in its transportation which effects the cost.

According to Wunsche process, D. F. Homig and W. E. Osberg in J. Chem. Phys. 1955, 23, 662, have used a two compartment cell consisting of a pair of graphite electrodes for the oxidation of bromide containing sea waters. In this method, a porous clay sheet was used as the diaphragm between the electrodes for better current efficiency. The cell was operated at 11.5 mA/cm2 against a cell potential of 3–4 V. The main disadvantages of this process are that the pores of the clay diaphragm get clogged by the insoluble magnesium hydroxide produced at the cathode compartment and hence reduce the process efficiency.

A. Anderson et al. in Phil. Mag. 1962, 7, 1243 have disclosed another Kossuth process wherein a simple electrochemical cell having bipolar carbon electrodes was employed without any diaphragm. In this cell, the cathode and the anode plates were mounted on a non-conductive plate of equal size in such a way that the exposed surfaces can carry the electrolysis process. The magnesium hydroxide precipitated on the cathode was dislodged by reversing the polarity of the electrodes and subsequently removed from the brominated solution by filtration before it was sent to a stripping column. The disadvantage of this method is that it requires additional device to reverse the polarity of the electrodes and increase one unit operation of filtration of magnesium hydroxide before sending to a bromine-stripping column, which are cumbersome and not economically viable. This process is inferior due to its low current (40–50%) efficiency.

More recently, Sumitomo Chemical Co. Ltd., Jpn. (JP 60 54,905; 29 Mar. 1985) have claimed the continuous manufacture of bromine and its steam distillation wherein the aqueous solutions of hydrobromic acid and sodium bromide were oxidized with chlorine gas. The drawback of this method requires handling of hazardous chlorine and is adaptable to low volumes. Moreover, the method requires acidifying the bromide solutions with a mineral acid.

T. Jakagi, S. Sigeo and S. Matsuoka from Toatsu Chemicals, Inc., Jpn. (JP 63 203,781, 23 Aug. 1988) have prepared a saturated solution of bromide containing raw salt and electrolyzed in an anode chamber of an ion-exchanger type cell under a slight application of pressure to concentrate bromine in the returned salt water. The drawbacks of this method are that it does not work in the presence of calcium and magnesium salts. Moreover, it requires pressuring the solution for concentrating the bromine.

N. Ogawa et al. from Tosoh Corp. Jpn. (JP 04,170,302, 18 Jan. 1992) have patented the manufacture of bromine by the oxidation of bromide in bromine containing salt solutions employing chlorine gas at pH≦4 and the freed bromine was separated with air in glass-bed packed columns. The drawbacks of this method are that it requires acidification of the salt solutions and also requires the handling of hazardous chlorine to oxidize bromide.

P. Schubert et al. in Catalytica, Inc. PCT Int. Appl. WO 9,306,039, 1 Apr. 1993, have disclosed a catalytic process for oxidizing bromine from alkali/alkaline earth metal bromide salts. In this process the source material is acidified to produce gaseous hydrobromic acid thereby oxidizing the bromide by oxygen over a metal oxide catalyst to produce a stream of bromine and water vapor. The drawbacks of this process are that it needs acidification and heating steps involving a catalyst, which adds to the production cost of bromine.

R. C. Williams et al. in U.S. Pat. No. 5,254,226, 19 Oct. 1993, have described an automatically operated electrolytic cell assembly and a method of efficiently providing brominated water using bipolar graphite electrodes. The drawbacks of this method are that it requires a mechanical devise to monitor the power on and off at a selected time and intermittently the polarity of the electrodes has to be reversed to clean the electrodes to prevent the formation of hydrolyzed products and subsequent clogging.

M. Jean-Charles et al. (PCT Int. Appl. WO 9,600,696, 11 Jan. 1996, 19pp. Fr) have revealed an apparatus working at high temperature and pressure for bromine recovery from liquid effluents. The combustion gases were cooled and subjected to hetero-azeotropic distillation to obtain the gaseous water-bromine mixture. The bromine was decanted at around 5° C. and distilled to get a purity of 99.9%. The main drawback of this method is that it involves energy intensive steps like combustion at high temperature and pressure and hetero-azeotropic distillation, which unnecessarily adds to the production cost.

M. Yamada et al. in the patent Kokai Tokkyo Koho JP 07,171,581, 11 Jul. 1995, have processed the photographic wastewaters for the recovery of bromine. It comprises the separation and recovery of bromine by spray incineration of photographic wastewater with alkali metal hydroxides, carbonate salts, nitrate salts and/or organic acid salts under oxidative atmosphere. Chlorine gas or hypochlorous acid was used to free the bromine in the incinerated water solution. The main drawbacks of this method are that it involves energy intensive steps like incineration with alkali metal hydroxides, carbonate salts, nitrate salts and/or organic acid salts under oxidative atmosphere and requires an additional oxidation step, which is uneconomical. Further, it needs handling of hazardous chlorine gas/hypochlorous acid.

OBJECTS OF THE INVENTION

The main object of the present invention is to provide a process for electrochemical oxidation of bromide to bromine in brine, bittern and effluents using a cation exchange membrane flow cell which obviates the drawbacks as detailed above.

An object of the present invention is to use an indigenous cation ion-exchange membrane in a two compartmental solid polymer electrolyte flow cell.

Yet another object of the present invention is to use precious triple metal oxide coated titanium as stable catalytic anode to oxidize bromide to bromine.

Still another object of the present invention is to oxidize inorganic bromide present in non-acidified brine, bittern or enriched effluents to bromine.

Further object of the present invention is to prevent clogging caused by the formation of insoluble sulfates or hydroxides of magnesium and calcium at the cathode.

Still another object of the present invention is to achieve the oxidation of 5 to 80% bromide to bromine under single pass conditions with 30 to 1000% coulombic efficiency.

SUMMARY OF THE INVENTION

The present provides a process for electrochemical oxidation of bromide to bromine. The present invention more particularly relates to oxidation of bromide ions in brine, bittern and effluents using an indigenous cation exchange membrane flow cell.

DETAILED DESCRIPTION OF THE INVENTION

Accordingly, the present invention provides a process for electrochemical oxidation of bromide to bromine, said process comprising the steps of;
(a) allowing bromide solution in the concentration range of 0.05–0.80% (w/v) to flow through the anode compartment;
(b) allowing a solution of 0 to 1 M of hydrochloric acid through the cathode compartment independently at a flow rate of 2 to 15 ml/min under gravity;
(c) controlling the cell current in the range of 1.0 to 12.5 mA/cm2 against 2 to 15 V at ambient temperatures between 20 and 40 degree C; and
(d) obtaining aqueous bromine.

An embodiment of the present invention, wherein the brine and bittern containing bromide in the range of 0.2–1.0% (w/v) is used.

Another embodiment of the present invention, wherein a brine containing bromide in the range of 0.2 to 0.3% (w/v) is used.

Still another embodiment of the present invention, wherein a bittern containing bromide in the range of 0.3 to 1.0% (w/v) is employed.

Yet another embodiment of the present invention, wherein the bromide solution consisting of 0–20% (w/v) of sodium chloride, 0–2% (w/v) of calcium, 0–12% (w/v) of magnesium, 0–3% (w/v) potassium chloride, 0–2% (w/v) sulfate, 0–40% (w/v) chloride and 0–0.01 M hydrochloric acid.

Still another embodiment of the present invention, wherein a solution of 0.1–0.3% (w/v) sodium bromide having 5–15% (w/v) of sodium chloride, 0–5% (w/v) of calcium chloride, 0–3% (w/v) of magnesium chloride and 0–0.01 M hydrochloric acid is used.

Yet another embodiment of the present invention, wherein 0–1 M hydrochloric acid is used as catholyte.

Further embodiment of the present invention, wherein the anolyte and catholyte solutions are allowed to flow in the range of 2 to 15 ml/min under gravity.

Yet another embodiment of the present invention, wherein the electrochemical oxidation of bromide ion is performed in a two-compartment electrochemical cell.

Further embodiment of the present invention, wherein the electrochemical cell having an expanded precious triple metal oxide coated titanium is used as anode and a thin stainless steel mesh, plate or expanded sheet as cathode.

Still another embodiment of the present invention, wherein the oxidation of bromide to aqueous bromine in the range of 5–80% at 30–100% coulombic efficiency is achieved.

Yet another embodiment of the present invention, a two-compartment rectangular cell of 18 cm×15 cm×5.5 cm consisting of a conventional cation exchange membrane of 80–180 cm2 area may be used.

Still another embodiment of the present invention, wherein hydrogen is liberated as a byproduct, which can be recycled in a fuel cell, if desired.

Yet another embodiment of the present invention, wherein the bromide solutions are passed under single pass conditions without the addition of acidifying agents.

The invention is further described in the form of following embodiments:

According to the present invention, bromide ion is oxidized by the loss of one electron per atom at the anode producing elemental bromine and sodium ion in solution.

2 NaBr→Br2+2 Na++2e−

The counter reaction at the cathode is the reduction of water or H+ in the case of H2SO4 as catholyte, liberating H2 gas with the release of OH— or Cl—, respectively.

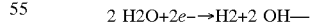
2 H2O+2e−→H2+2 OH—

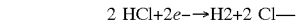
2 HCl+2e−→H2+2 Cl—

The excess sodium (cation) ion liberated in the anode compartment migrates to the cathode compartment, for charge balancing by crossing over the ion-exchange membrane producing sodium hydroxide/corresponding metal hydroxide/chloride on the other side as the co-product. The overall cell reaction is then given as

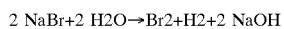
2 NaBr+2 H2O→Br2+H2+2 NaOH

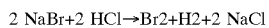
2 NaBr+2 HCl→Br2+H2+2 NaCl

The reaction was conducted on a laboratory scale using a rectangular (18 cm×15 cm×5.5 cm) teflon membrane cell consisting of a thin stainless steel plate, mesh or an expanded sheet as cathode and a special triple metal oxide coated titanium as anode having an effective surface area of 56 cm2, one on either side of the membrane. A solution of (i) AR grade sodium bromide (0.1 to 0.3%, w/v) having 5 to 15% (w/v) sodium chloride, 0–5% (w/v) calcium chloride, 0 to 3% (w/v) magnesium chloride and 0 to 0.01 M hydrochloric acid, ii) under ground brine or brine of 26.8 °Be' containing 1.8 g/l bromide; 0.07 g/l calcium (II); 50.1 g/l magnesium Mg (II); 20.62 g/l sodium Na (I); 41 g/l potassium K(I); 202.31 g/l chloride and 18.7 g/l sulfate and iii) the end bittern (34 °Be') containing 7.5 g/l bromide; 18.5 g/l sodium chloride; 2.7 g/l potassium chloride; 108.5 magnesium Mg(II); 3.2 g/l calcium Ca(II); 0.275 g/l sulfate and 394.78 g/l chloride having pH 3.9 obtained after the recovery of salt, potash and magnesia chemicals from the pilot plant were used in the present study. Double distilled water or 0.1 to 1.0 M hydrochloric acid was used as a common catholyte in all the experiments.

An indigenous cation exchange membrane (P. K. Narayanan et al. Indian Patent No. 160,880, 1987) was used in the cell to keep the electrode chambers separate. The cell temperature varied between 27 and 30° C. The anolyte and catholyte solutions were allowed to flow at the rate in the range of 2–15 ml/min through the respective electrode chambers under gravitational force while the electrolysis was in progress.

When handling with dilute solutions or bittern, it is preferable to oxidize the bromide solutions at low current densities between 2–7 mA/cm2 to achieve maximum percentage of bromide conversion in a single pass at 10–15 ml/min flow rate to bromine with high coulombic efficiency. It is also advantageous to work with concentrated solutions of bromide at high current densities and flow rates for maximum yields of bromine and high coulombic efficiency.

In the present invention the current density is varied in the range of 0.1 to 13 mA/cm2. It was found that the percentage of conversion in 0.2% sodium bromide, 10% sodium chloride mixture at 10 ml/min flow rate to bromine increased linearly with the increase in current density from 1–5 mA/cm2 and remained constant between 5–10 mA/cm2 and decreased thereafter due to parallel oxidation of water to oxygen and/or chloride to chlorine. Subsequently, the cell efficiency grew to a maximum of 60% between 2–6 mA/cm2 and decreased on either side. It is generally preferable to work at low current densities for larger percentage of bromine production with high coulombic efficiency preventing the formation of oxygen and chlorine, and the formation chlorobromide in subsequent steps at moderately high (10 ml/min) flow rates. High flow rate conditions are more advisable to work with high current densities for converting maximum percentage of bromide to bromine, in a single pass, with >90% efficiency.

It is generally preferable to oxidize bromide to bromine in the presence of large concentration of sodium chloride. Lower current densities are advisable to enhance both the bromide oxidation and the cell efficiency while working with solutions having large sodium chloride composition.

While carrying out the process with 0.2% sodium bromide in 10% sodium chloride, the addition of 3% magnesium chloride, 5% calcium chloride, or 0.01 M hydrochloric acid to the anolyte solution; or 0.1 M hydrochloric acid to the catholyte improved the product yield by about 3–12%, 6–18%, 5–12% or 3–7%, respectively along with the cell efficiency.

While working the process with the end bittern as anolyte and 1 M hydrochloric acid as catholyte, the quantity of bromide converted to bromine was found to be between 5–15% at the current density 1–11 mA/cm2 when flow was adjusted to 10 ml/min. It decreased on increasing the current density further. The current efficiency under these conditions, was almost 100% at all current densities <10 mA/cm2 and it subsequently decreased at high current densities. From the results at different current densities and flow rates, it is advisable to work with the end bittern at low current densities (3–10 mA/cm2) and high flow rates (10–15 ml/min) for nearly 100% coulombic efficiency with an average of 7–12% bromide conversion or high current densities (3–10 mA/cm2) and low flow rates (2–5 ml/min) for high (14–31%) bromide conversion with an average coulombic efficiency between 40 and 50%. The potential drop across the cell varied from 5 to 14 depending upon the current density applied. It was <10 V at all current densities <5 mA/cm2 and it showed a decreasing trend as the flow rate increases. So, it is advantageous to work with the concentrated solutions like the end bittern here, at high flow rates (10–15 ml/min) and reasonably high current densities (3–10 mA/cm2) for better bromine yields for 100% coulombic efficiency and low (5–6 V) cell potential. In these studies, the pH of the end bittern after the single pass, varied between 2.0–3.9, depending on the experimental conditions.

The process according to the present invention is started at room temperature and maintained between 26 and 30° C. during the cell operation. In this temperature range, the inorganic bromide converted to bromine with excellent yields. No appreciable loss was found in bromine content due to evaporation or by the reactions at both the electrodes. The bromide in the original solution or the oxidized bromine in the anode compartment was not transported to the cathode compartment through the membrane. The membrane and the cell body were also found to be intact even after carrying the experiments for several hours.

A constant current ranging between 0.05–0.70 A is applied across the two working electrodes. In all cases, the cell potential across the two current carrying electrodes was measured in the range of 2–5 V. The anodized solutions, in single pass conditions under the given set of experimental parameters were collected. The pH of these solutions was initially at 6.8–7.0 and it decreased to 2.60–1.48, depending on the magnitude of the current applied at the electrodes, while that of the water in cathode compartment was between 10 and 12. The catholyte solution (water, 0.1 or 1 M hydrochloric acid) was circulated or replaced by the fresh as and when required. Bromine in all the anodized solutions was estimated by the spectrophotometric method (K. Kumar and D. W. Margerum, Inorg. Chem. 1987, 26, 2706–2711) following the characteristic 390 nm band for bromine in acidic solution. Shimadzu UV-160A, UV-vis Recording Spectrophotometer provided with one cm quartz cuvets was used. At 390 nm, both Br2 and Br3—($\epsilon$=600 M-1 cm-1) contribute to the absorbance. Using the absorbance data and the molar extinction coefficient ($\epsilon$), the percentage of bromide converted in a single pass to bromine under a set of known experimental conditions was calculated.

Electrolysis of the under ground brine (26.8 °Be') collected from the experimental salt form having the composition of 1.8 g/l bromide, 0.07 g/l calcium, Ca(II), 50.1 g/l magnesium, Mg(II), 20.62 g/l sodium, Na(I), 41 g/l potassium, K(I), 202.31 g/l chloride and 18.7 g/l sulfate at pH 6.67 was done by passing it without any further purification through the anode and 0.1 M hydrochloric acid through the cathode compartments at the current densities between 4–7 mA/cm2. Precipitates of Mg2+ or Ca2+ either in the catholyte or anolyte chambers, or in their solutions were not seen. The pH of the anolyte after single pass varied between 1.5–1.7, while the catholyte pH rose to 7 in 3–4 cycles.

The bittern (34 °Be' with 8.5 g/l bromide, 18.5 g/l sodium chloride, 2.7 g/l potassium chloride, 108.5 magnesium, Mg (II), 3.2 g/l calcium, Ca (II), 0.275 g/l sulfate, 394.78 g/l chloride at pH 3.9) collected from pilot plant at this institute after the recovery of salt, potash and magnesia chemicals was electrolyzed by passing it without any further treatment through the anode and 1 M hydrochloric acid through the cathode compartments at the current densities between 1.0 and 12.5 mA/cm2 and flow rates 2 to 15 ml/min. Precipitates of magnesium or calcium either in the catholyte or anolyte chambers, or in their solutions were not seen.

The present invention describes an improved electrochemical method of oxidation of inorganic bromide in bromide containing solutions to bromine employing a two-compartment electrochemical membrane cell. The process involves the passage of bromide containing solutions through the anode compartment while a solution of 0–1 M hydrochloric acid flows through the anode compartment, both at 2 to 15 ml/min under gravity. The membrane flow cell consists of an expanded precious triple metal oxide coated titanium anode and a thin stainless steel mesh, plate or expanded sheet as cathode. The electrodes are separated by placing a conventional cation-exchange membrane between them at a distance of 2 to 6 mm from each electrode to keep the products produced at the electrodes separated. This method is useful to oxidize the bromide ion at low current densities between 1.0 to 12.5 mA/cm2 against 2 to 15 V conveniently at ambient temperatures. This process can be carried out in the presence of other interfering ions such as calcium, magnesium, chloride etc with minimum problems caused by clogging and precipitation. It is highly useful for the oxidation of bromide ion in brine and bittern samples without involving corrosive and costly chemicals or the acidification step. About 5 to 80% of bromide conversion can be obtained under single pass conditions with 30 to 100% coulombic efficiency depending on the conditions. Additionally, hydrogen gas is obtained as a byproduct at the cathode. Some of the novel and inventive steps of the present invention are that i) it is uses an indigenous cation exchange membrane as solid polymer electrolyte for supporting and enhancing the cell efficiency, ii) the products formed at the respective electrodes are separated, iii) it uses a stable, durable and catalytic anode for the oxidation of bromide to bromine in the absence of externally added mineral acid and a cheap cathode and iv) it eliminates the problem of clogging.

The following examples are given by way of illustrations of the present invention and should not be construed to limit the scope of the present invention.

EXAMPLE 1

The oxidation of bromide is effected by flowing the aqueous solution composed of 0.2% sodium bromide and 10% sodium chloride through the anode and distilled water through cathode compartments. A constant current of 6.25 mA/cm2 is passed across the two electrodes while both of the solutions flew at 10-ml/min rate. The cell potential is dropped to 3 V, while the solution temperature is maintained at 28° C. The percentage of bromide converted to bromine, in single pass is 65.5 with 58.4% coulombic efficiency. The anolyte solution turned acidic to pH 1.73.

EXAMPLE 2

The solution described in example 1 is electrolyzed in the same cell at the current density 6.25 mA/cm2. The cell potential is dropped to 3 V while the solutions are set to flow at the rate of 15 ml/min. The temperature is maintained at 28±2° C. The percentage of bromide converted to bromine under steady state conditions is 68.2%. The coulombic efficiency rose to 85% while the pH of the solution dropped to 1.75.

EXAMPLE 3

Using the same cell as in example 1, a solution containing 0.2% sodium bromide, 10% sodium chloride and 5% calcium chloride (3% magnesium chloride) is electrolyzed at the anode at a current density of 6.25 mA/cm2. A solution of 0.1 M hydrochloric acid is circulated through the cathode compartment to prevent the deposition of calcium (magnesium) hydroxide on the membrane surface facing towards the cathode by the reaction of them with hydroxyl ions produced in the cathode compartment. Both, the anolyte and catholyte solutions are set to flow at the rate 10 ml/min during the electrolysis. The cell potential, in such conditions, varied between 3 and 4 V. The cell temperature remained at 28° C. The bromine content in the anodized solution in a single pass is 0.55 g (0.53 g) revealing the 71.3% (68.4%) conversion of bromide in the solution to bromine, respectively with 63.6% (61.0%) coulombic efficiency.

EXAMPLE 4

Bromine is also produced in the same cell as in example 1 by electrolyzing the under ground brine (26.8 °Be') having the composition of 1.8 g/l bromide, 0.07 g/l calcium, Ca(ll), 50.1 g/l magnesium, Mg(II), 20.62 g/l sodium, Na(I) 41 g/l potassium, K(I) 202.31 g/l chloride and 18.7 g/l sulfate at pH 6.67, as collected from the experimental salt farm. The brine solution without any further treatment is run through the anolyte compartment at the rate of 10 ml/min. Simultaneously, a solution of 0.1 M hydrochloric acid is run at the same rate through the cathode compartment to prevent the hydrolysis of Ca2+ and Mg2+ in the cathode compartment. Electrolysis is effected by applying a current density of 6.25 mA/cm2 across the two electrodes. The cell potential is dropped to 3 V, while the solution temperature maintained at 28° C. The percentage of bromide converted to bromine in the single pass anodized solution is 70.3 with about 65% coulombic efficiency. The pH of the anolyte solution is 1.73.

EXAMPLE 5

Bromide is also oxidized to bromine in the same cell as in example 1 by electrolyzing the end bittern (34 °Be') having the composition of 8.5 g/l bromide 18.5 g/l sodium chloride, 2.7 g/l potassium chloride, 108.5 magnesium, Mg (II), 3.2 g/l calcium, Ca (II), 0.275 g/l sulfate, 394.78 g/l chloride at pH 3.9. The end bittern without any further treatment, is run through the anolyte compartment at the rate 2–15 ml/min while varying the current density between 1–13 mA/cm2. Simultaneously a solution of 1 M hydrochloric acid is run at the same rate through the cathode compartment. When electrolysis is effected by applying a current densities of 4.5 and 9.82 mA/cm2 across the two electrodes at 10 ml/min flow rate, the cell potential dropped to 7 and 13 V, respectively while the solution temperature maintained at 28° C. in both the cases. The percentage of bromide converted to bromine in the single pass is 7.8 at 4.5 mA/cm2 and 15.1 at 9.82 mA/cm2 with 100% and 93.5% coulombic efficiency, respectively. The pH of the anolyte solutions is negligibly changed.

EXAMPLE 6

The end bittern described in example 6 is electrolyzed in the same cell at two current densities 4.5 and 8.0 mA/cm2 at two different flow rates 2 and 15 ml/min. The percentage of bromide converted to bromine at 4.5 mA/cm2, is 14.0 at 2 ml/min and 11.5 at 15 ml/min, while at 8.0 mA/cm2, it is 30.8 at 2 ml/min and 11.9 at 15 ml/min flow rates. The coulombic efficiencies in these cases are 38.2 and 100% at 4.5 mA/cm2 and 46.8 and 100% at 8.0 mA/cm2 at 2 and 15 ml/min flow rates, respectively. The pH of the anolyte solutions varied between 3.0 and 3.9 while the cell temperature maintained at 28° C.

ADVANTAGES OF THE PRESENT INVENTION

1. This method is easy, eco-friendly and less energetic relatively to the existing ones.
2. It oxidizes the bromide to bromine to a considerable extent in single pass at low energy and low current densities with high coulombic efficiency.
3. It avoids the addition of a mineral acid, electrolyte, special catalyst or solvent to the bromide source thereby minimizing the production cost and any damage to the equipment.
4. It does not involve any corrosive oxidants like chlorine and other oxo-compounds, which attacks the materials of the equipments.
5. It operates under ambient conditions of temperature and pressure.
6. Hydrogen is liberated as a byproduct, which can be recycled in a fuel cell, if desired.
7. The process eliminates the problem of clogging.
8. It involves a compact cell conserving energy by avoiding steps like heating, acidification, separation and purification of hydrolysable materials from the medium.
9. The method involves an inexpensive and easily moldable plastic cell with an inexpensive cathode and a non-polarizable anode for effecting the electrolysis.
10. The membrane is easy to procure, install and durable.

We claim:

1. A process for electrochemical oxidation of bromide to bromine, said process comprising the steps of:
   (a) allowing bromide solution in the concentration range of 0.05–0.80% (w/v) to flow through an anode compartment;
   (b) allowing a solution of 0 to 1 M of hydrochloric acid through an cathode compartment independently at a flow rate of 2 to 15 ml/min under gravity;
   (c) controlling the cell current in the range of 1.0 to 12.5 mA/cm2 against 2 to 15 V at ambient temperatures between 20 and 40 degree C.; and
   (d) obtaining aqueous bromine.

2. The process of claim 1, wherein the brine and bittern containing bromide in the range of 0.2–1.0% (w/v) is used.

3. The process of claim 2, wherein a brine containing bromide in the range of 0.2 to 0.3% (w/v) is used.

4. The process of claim 2, wherein a bittern containing bromide in the range of 0.3 to 1.0% (w/v) is employed.

5. The process of claim 1, wherein the bromide solution consisting of 0–20% (w/v) of sodium chloride, 0–2% (w/v) of calcium, 0–12% (w/v) of magnesium, 0–3% (w/v) potassium chloride, 0–2% (w/v) sulfate, 0–40% (w/v) chloride and 0–0.01 M hydrochloric acid.

6. The process of claim 1, wherein a solution of 0.1–0.3% (w/v) sodium bromide having 5–15% (w/v) of sodium chloride, 0–5% (w/v) of calcium chloride, 0–3% (w/v) of magnesium chloride and 0–0.01 M hydrochloric acid is used.

7. The process of claim 1, wherein 0–1 M hydrochloric acid is used as catholyte.

8. The process of claim 1, wherein the anolyte and catholyte solutions are allowed to flow in the range of 2 to 15 ml/min under gravity.

9. The process of claim 1, wherein the electrochemical oxidation of bromide ion is performed in a two-compartment electrochemical cell.

10. The process of claim 1, wherein the electrochemical cell having an expanded precious triple metal oxide coated titanium is used as anode and a thin stainless steel mesh, plate or expanded sheet as cathode.

11. The process of claim 1, wherein the oxidation of bromide to aqueous bromine in the range of 5–80% at 30–100% coulombic efficiency is achieved.

12. The process of claim 1, wherein hydrogen is liberated as a byproduct, which can be recycled in a fuel cell, if desired.

13. The process of claim 1, wherein the bromide solutions are passed under single pass conditions without the addition of acidifying agents.

* * * * *